United States Patent [19]

Harju et al.

[11] Patent Number: 4,855,056
[45] Date of Patent: Aug. 8, 1989

[54] PROCESS FOR THE DEMINERALIZATION OF WHEY OR A LIQUID BASED ON WHEY AND FOR PRODUCING AN ACID MIXTURE AND A BASE MIXTURE USEFUL IN FOOD INDUSTRIES

[75] Inventors: Matti Harju, Nummela; Matti Heikonen, Espoo, both of Finland

[73] Assignee: Valio Meijerien Keskusosuusliike, Helsinki, Finland

[21] Appl. No.: 266,677

[22] Filed: Nov. 3, 1988

[30] Foreign Application Priority Data

Nov. 6, 1987 [FI] Finland .................................. 874925

[51] Int. Cl.⁴ ............................................ B01D 13/00
[52] U.S. Cl. .................... 210/638; 210/639; 210/641; 210/644; 210/649
[58] Field of Search ............... 210/634, 638, 639, 641, 210/644, 645, 649, 650, 651, 652, 500.37; 204/182.4

[56] References Cited

U.S. PATENT DOCUMENTS 4,012,324  3/1977  Gregor ........................... 210/500.37
4,331,525  5/1982  Huba et al. ....................... 204/182.4
4,554,076 11/1985  Speaker ............................... 210/639

Primary Examiner—Frank Sever
Attorney, Agent, or Firm—Cushman, Darby & Cushman

[57] ABSTRACT

The invention relates to a process for removing at least a portion of salts contained in whey or a liquid based on whey by means of electrolysis while producing an acid mixture and a base mixture useful in food industries. In the process a four-compartment electrolytic cell is used in the electrolysis of the whey or the liquid based on whey. The four compartments between an anode and a cathode are separated from each other by means of ion exchange membranes and an independent liquid recirculation is connected with each one of the four compartments of the electrolytic cell.

12 Claims, 1 Drawing Sheet

SCHEMATICAL VIEW OF THE USE OF A FOUR-COMPARTMENT ELECTROLYTIC CELL IN DEMINERALIZATION OF WHEY AND SIMULTANEOUS PRODUCTION OF AN ACID AND A BASE

SCHEMATICAL VIEW OF THE USE OF A FOUR-COMPARTMENT
ELECTROLYTIC CELL IN DEMINERALIZATION OF WHEY AND
SIMULTANEOUS PRODUCTION OF AN ACID AND A BASE
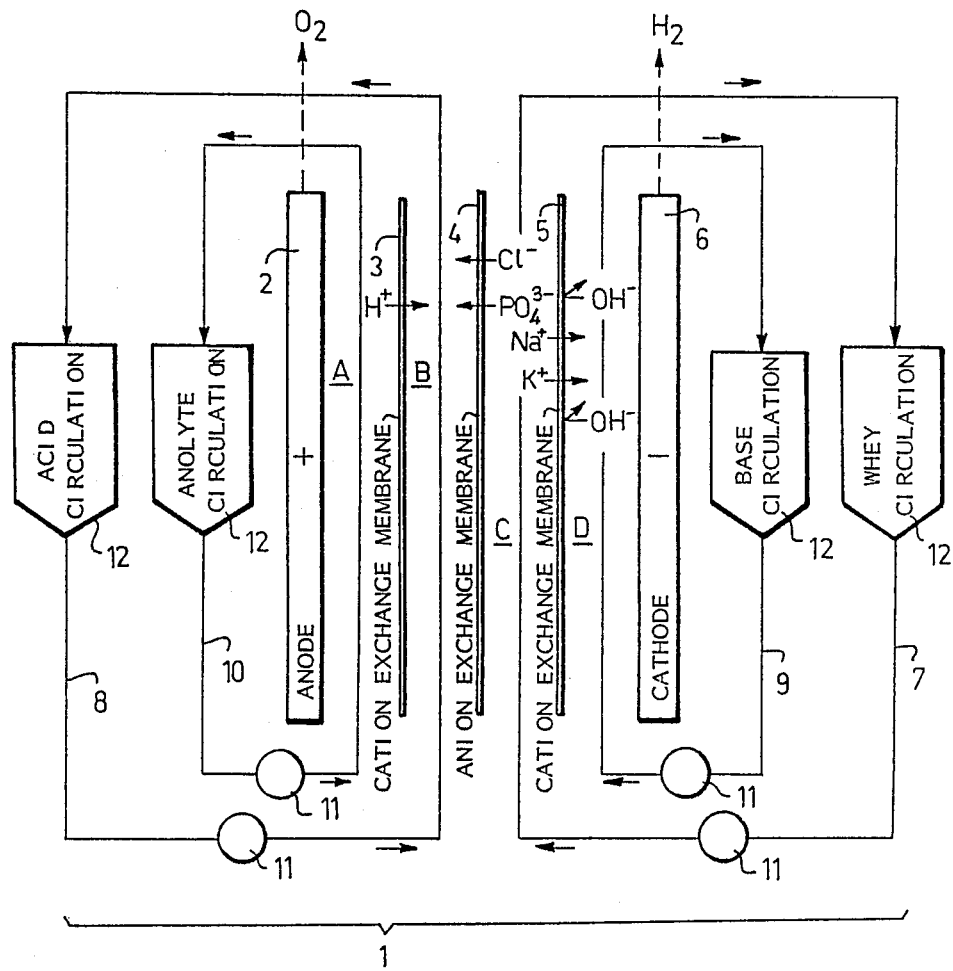

PROCESS FOR THE DEMINERALIZATION OF WHEY OR A LIQUID BASED ON WHEY AND FOR PRODUCING AN ACID MIXTURE AND A BASE MIXTURE USEFUL IN FOOD INDUSTRIES

BACKGROUND OF THE INVENTION

A process for the demineralization of whey or a liquid based on whey and for producing an acid mixture and a base mixture useful in food industries The invention relates to a process for removing by electrolysis at least a portion of salts contained in whey or a liquid based on whey while producing an acid mixture and a base mixture useful in food industries. The invention is further concerned with products obtained by means of the process, particularly with an acid mixture and a base mixture useful in food industries.

The high salt content of whey obtained as a side product in the production of cheese and casein is the main reason why whey cannot be used in foodstuffs. However, demineralized whey powder has many uses in baby foods, ice-cream and bakery industries. Demineralization of whey has long been carried out by electrodialysis and ion exchange. Such techniques have also been combined for improving the efficiency and economy of the demineralization process (see e.g. British Patent Specificiation 1,583,814). It is typical of all the techniques mentioned above that the salts contained in whey as well as small amounts of the other whey solids, i.e. lactose and proteins, get into the waste water. Waste water treatment increases considerably the cost of the demineralization process and may even prevent the introduction of the process. Since waste waster regulations are becoming increasingly strict, attempts have been made to solve this problem. Recently, a new demineralization process based on ion exchange has been developed in which part of the regeneration chemicals can be reused (see e.g. U.S. Patent Specification 4,159,350). However, this process, to, produces considerable amounts of waste water, so there is still a need of new techniques by means of which waste water problems are avoided or at least substantially reduced.

On the other hand, it has long been known that a salt solution can be rendered to a corresponding acid and base in an electrolytic cell divided into four compartments by means of cation and anion exchange membranes (see e.g. French Patent Specification 1,324,549). This techique, however, has been applied only to the treatment of pure inorganic and organic salts. Electrolysis as such has also been used experimentally in the treatment of milk (see e.g. British Patent Specification 2,100,289 A); however, the cell structure described in the examples has thereby comprised two or three compartments and the aim has not been to demineralize milk but to adjust its pH.

SUMMARY OF THE INVENTION

It has now been unexpectedly discovered that problems caused by salt-containing waste waters formed in the demineralization of whey, such as cheese whey or acid whey, or a liquid based on whey, such as permeate or mother liquor from the production of lactose, are avoided when the demineralization is carried out by means of a four-compartment electrolytic cell. At the same time the anions and cations of salts contained in the whey or the liquid based on whey are recovered. The anions are recovered in an acid circulation solution which is thus composed of an acid mixture. Correspondingly, the cations are recovered in a base circulation solution which is thus composed of a base mixture. Said circulation solutions can be used as acids and bases in the food industries, for instance. In this way it is e.g. possible to produce acid and base from whey while it is demineralized.

As an electrolytic raw material, whey is in many respects more problematic than a pure salt solution. Whey contains proteins which precipitate easily especially close to their isoelectric point (pH 4 to 5). In addition, cheese whey always contains so called "cheese dust", i.e., finely divided casein precipatate. Whey further contains residual fat and relatively plenty of calcium which precipitates easily at a high pH in particular. When demineralizing whey in an electrodialysis apparatus, for instance, it is necessary to continuously add hydrochloric acid to the salt solution side so as to prevent calcium precipitation. Therefore it is highly surprising that no precipitation problems could be observed in the whey electrolysis tests and that the demineralizing efficiency was not substantially dependent on the pH of the whey, as appears from the examples set forth below.

The process according to the invention, in which at least a portion of salts contained a liquid selected from whey and liquids based on whey is removed by electrolysis while producing an acid mixture and a base mixture useful in food industries, comprises using a four-compartment electrolytic cell in the electrolysis of the liquid selected from whey and liquids based on whey, the electrolytic cell comprising in succession (a) an anolyte compartment defined by an anode plate and a first cation exchange membrane, (b) an acid compartment defined by the first cation exchange membrane and an anion exchange membrane, (c) a whey compartment defined by the anion exchange membrane and a second cation exchange membrane and intended for the liquid to be treated which is selected from whey and liquids based on whey, and (d) a base compartment defined by the second cation exchange membrane and a cathode plate, independent liquid recirculations being connected to each one of the four compartments of the electrolytic cell; whereby the starting solution used in the liquid recirculation connected with the whey compartment is a liquid selected from cheese whey, acid whey, permeate and a mother liquor from the production of lactose, each as such, and from cheese whey, acid whey, permeate and a mother liquor from the production of lactose, each as concentrated to a dry matter content of no more than 40% by weight; the starting solution used in the acid recirculation connected with the acid compartment is a liquid selected from acid solutions having an anion composition correspondng to that of the liquid to be treated which is selected from whey and liquids based on whey, and lactic acid; the starting solution used in the base recirculation connected with the base compartment is a liquid selected from base solutions having a cation composition corresponding to that of the liquid to be treated which is selected from whey and liquids based on whey, and sodium hydroxide; and the starting solution used in the anolyte recirculation connected with the anolyte compartment is an aqueous solution of an acid.

BRIEF DESCRIPTION OF THE DRAWING.

The drawing shows a schematic view of the use of a four-compartment electrolytic cell according to the invention in the demineralization of whey and simultaneous production of acid and base.

DETAILED DESCRIPTION

The electrolytic cell 1 comprises in succession an anolyte compartment A defined by an anode plate 2 and a first cation exchange membrane 3, an acid compartment B defined by the first cation exchange membrane and an anion exchange membrane 4, a whey compartment C defined by the anion exchange membrane and a second cation exchange membrane 5 and intended for the whey or the liquid based on whey which is to be treated, and a base compartment D defined by the second cation exchange membrane and a cathode plate 6.

The anode can be formed by conventional plate electrodes used in electrolytic cells, such as a platinated titan electrode. The cathode can correspondingly be formed by conventional plate electrodes used in electrolytic cells, e.g. of stainless steel.

The following net reactions occur at the anode and the cathode:

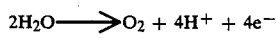

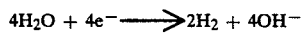

The ion exchange membranes can be conventional ion-selective semi-permeable cation exchange membranes and anion exchange membranes used in electrodialysis. In the cell the ion exchange membranes and the electrode plates are assembled into a stack in which the ion exchange membranes are separated from each other and/or from the electrode plates by means of conventional spacers. Individual cells can be connected in series and/or in parallel.

A liquid recirculation 7 is connected with the whey compartment C, an acid recirculation 8 is connected with the acid compartment B, a base recirculation 9 is connected with the base compartment D, and an anolyte compartment B.

The independent liquid recirculations connected with the different compartments of the cell are provided with separate pumps 11, containers 12 and outlets. The recirculations, particularly the acid, base and anolyte recirculations, can be connected with the respective recirculations of other cells.

The process according to the invention can be carried out in a batchwise manner, whereby the demineralized liquid and the resultant acid and base solutions are recovered. The process can also be carried out continuously, whereby the recirculation of the liquid to be demineralized can be continuously supplied with fresh liquid while demineralized liquid is being removed from the circulation. The acid and base recirculations can be correspondingly made continuous.

When several cells are used the recirculations can be connected with the respective recirculations of another cell or other cells.

In the anolyte recirculation connected with the anolyte compartment, the starting solution is an aqueous solution of an acid, preferably an aqueous solution of a 0.5 to 3% by weight acid. The most suitable anolyte solution is an aqueous solution of 1% sulphuric acid.

In the acid recirculation connected with the acid compartment, the starting solution is an acid solution having an anion composition corresponding to that of the liquid to be treated which is selected from whey and liquids based on whey, or lactic acid. Preferably, said acid solution is used as a starting liquid in the acid recirculation means.

When an acid solution has an anion composition corresponding to that of whey, its anion composition resembles that of whey and preferably is similar to that of whey.

In the base recirculation connected with the base compartment, the starting solution is a base solution with a cation composition corresponding to that of the liquid to be treated which is selected from whey and liquids based on whey, or sodium hydroxide. Preferably, said base solution is used as a starting solution in the base recirculation.

When a base solution has a cation composition corresponding to that of whey, its cation composition resembles that of whey and preferably is similar to that of whey.

In the liquid recirculation connected with the whey compartment, the starting solution is e.g. cheese whey, acid whey, permeate obtained from the ultrafiltration of whey, or mother liquor from the production of lactose as such or concentrated to a dry matter content of no more than 40% by weight.

A suitable process temperature is 0° to 60° C., preferably 20° to 50° C.

The process according to the invention is particularly suitable for use in the demineralization of whey. The composition of typical cheese whey is shown in the following Table 1; the composition of acid whey is nearly similar to that of cheese whey.

TABLE 1

| Composition of typical cheese whey | | |
|---|---|---|
| Dry content | 6.0% | by weight |
| Lactose | 4.5% | " |
| Protein | 0.7% | " |
| Fat | 0.1% | " |
| Ash | 0.5% | " |
| Calcium | 350 | mg/l |
| Magnesium | 90 | " |
| Sodium | 450 | " |
| Potassium | 1400 | " |
| Phosphor | 450 | " |
| Chloride | 1000 | " |
| Lactic acid | 900 | " |
| Citric acid | 1400 | " |

The cation and anion composition of whey appears from Table 1.

In the electrolytic cell shown in the drawing, the cations contained in the whey recirculation, such as $K^+$ and $Na^+$ ions, migrate through the cation exchange membrane into the base recirculation, where they form hydroxides with $OH^-$ ions formed at the cathode, so that the base recirculations is concentrated and the amount of hydroxides corresponding to these particular ions is increased in the base recirculation. If an aqueous solution of sodium hydroxide is used as a starting solution in the base recirculation, it is converted to a mixture of the aqueous solutions of potassium, sodium, calcium och magnesium hydroxides during the process. At the same time anions contained in the whey recirculation, such as $Cl^-$ and $PO_4^{3-}$ ions, migrate through the anion exchange membrane into the acid recirculation, where they form corresponding acids with $H^+$ ions migrated into the acid recirculation from the anolyte recirculation through the cation exchange membrane, so that the acid recirculation is concentrated. If an aqueous solution of lactic acid is used as a starting solution in the acid recirculation, it is converted into a mixture of the aqueous solutions of citric acid, lactic acid, hydrochloric acid and phosphoric acid during the process.

Being physically separated from a foodstuff, the base and acid mixtures forming the base recirculation and the acid recirculation can obviously be regarded as suitable for use in foodstuffs as such. Said acid and base mixtures could thus be used e.g. in washings and pH adjustments at the same plant or they could be sold to other food manufacturers after concentration, if necessary.

Demineralized liquid, such as whey, is recovered as such or is concentrated and dried into a powder for further use.

Whey is preferably concentrated before electrolysis for improving conductivity and the demineralizing efficiency dependent thereon.

The process according to the invention can also be used in the treatment of liquids based on whey and having the same salt composition as whey. Such liquids include the ultrafiltration permeate of whey and the mother liquor formed in the production of lactose. Whey proteins are recovered in the ultrafiltration of whey while permeate is obtained as a side product containing the ingredients which have passed through the ultrafiltration membrane, i.e., lactose, whey salts and low-molecular nitrogen compounds. In the lactose manufacture, lactose is removed from whey by crystallization, thus obtaining a mother liquor containing the whey salts, for instance. These possibilities are also described in the examples, where the percentages are percentages by weight.

EXAMPLE 1

The tests were carried out with a Stackpack electrolysis apparatus of Ionics Inc., comprising 18 four-part electrolytic cells. The effective membrane area of each cell was 232 cm$^2$, the effective membrane area of the whole stack being 0.42 m$^2$. The tests were carried out in a batchwise manner so that the whey, acid and base compartments formed separate recirculations with their pumps and containers; in addition, the anolyte compartment comprises separate recirculation in which 1% sulphuric acid was circulated. 3% lactic acid was used as a starting solution in the acid recirculation and 3% sodium hydroxide in the base recirculation. 20% cheese whey concentrate having a pH of 5.3 was used as a raw material. Table 2 shows the parameters of the test and Table 3 the results obtained from the test.

TABLE 3

Results from the demineralization of cheese whey concentrate (pH 5.3) when using electrolysis

| | Time (min) | | | | | |
|---|---|---|---|---|---|---|
| | 0 | 10 | 20 | 30 | 40 | 50 |
| Whey recirculation | | | | | | |
| Dry matter (°Brix) | 19.0 | 18.5 | 18.2 | 18.1 | 17.9 | 17.6 |
| Conductivity (mS/cm) | 9.5 | 4.3 | 3.0 | 2.0 | 1.2 | 0.7 |
| Phosphor, soluble (mg/kg) | 830 | 550 | 390 | 280 | 200 | 140 |
| Chloride (g/kg) | 3.7 | 1.1 | 0.65 | 0.35 | 0.18 | 0.10 |
| pH | 5.3 | 5.2 | 5.0 | 4.8 | 4.6 | 4.3 |
| Ash (%) | 1.5 | | | | | 0.24 |
| Calcium (mg/kg) | 1100 | | | | | 290 |
| Magnesium (mg/kg) | 230 | | | | | 74 |
| Sodium (mg/kg) | 1600 | | | | | 320 |
| Potassium (mg/kg) | 4400 | | | | | 430 |
| Protein (%) | 2.5 | | | | | 2.6 |
| Lactose (%) | 13.7 | | | | | 13.8 |
| Solution volume (l) | 7.3 | | | | | 6.7 |
| Acid recirculation | | | | | | |
| Titratable acidity (% lactic acid) | 2.2 | 2.8 | 3.1 | 3.3 | 3.4 | 3.5 |
| Conductivity (mS/cm) | 3.3 | 22 | 28 | 31 | 33 | 34 |
| pH | 2.2 | 1.4 | 1.3 | 1.2 | 1.2 | 1.2 |
| Phosphor, soluble (mg/kg) | 10 | 150 | 260 | 380 | 470 | 540 |
| Chloride (g/kg) | 0.12 | 2.2 | 2.9 | 3.2 | 3.3 | 3.3 |
| Solution volume (l) | 6.1 | | | | | 8.1 |
| Base recirculation | | | | | | |
| Titratable acidity (% sodium hydroxide) | 2.4 | 2.6 | 2.7 | 2.9 | 3.1 | 3.2 |
| Conductivity (mS/cm) | 74 | 78 | 83 | 88 | 90 | 93 |
| Solution volume (l) | 4.6 | | | | | 4.6 |

The current density was adjusted at the beginning of the run to 4.2 A/cell and it was not adjusted during the run. The apparatus did not comprise temperature adjusting means, wherefore the temperature of the solutions rose during the run. As appears from Table 3, the whey salts are removed similarly as in conventional demineralization techniques, simultaneously obtaining acid and base. Lactose and protein do not migrate through the membranes to any greater extent.

EXAMPLE 2

Example 1 was repeated except that the pH of the whey concentrate was adjusted for run (a) prior to the run to 6.3 and for run (b) prior to the run to 4.3. These changes did not substantially affect the results.

EXAMPLE 3

Concentrated acid whey obtained from the production of casein was used as raw material. Table 4 shows the parameters and Table 5 the analysis results. With the exception of the ray material, the conditions were the same as in Example 1.

TABLE 2

Parameters in the demineralization of cheese whey concentrate (pH 5.3) when using electrolysis

| Time (min) | Temperature (°C.) | Current/cell (A) | Voltage/cell (V) | Current density (A/m$^2$) | Flow whey (l/min) | acid (l/min) | base (l/min) | anolyte (l/min) |
|---|---|---|---|---|---|---|---|---|
| 0 | 24 | 4.2 | 5.7 | 180 | 1.6 | 2.5 | 5.3 | 5.3 |
| 10 | 28 | 3.7 | 5.8 | 160 | 0.7 | 1.3 | 3.1 | 3.0 |
| 20 | 31 | 3.4 | 6.0 | 150 | 0.8 | 1.3 | 3.3 | 3.1 |
| 30 | 34 | 3.0 | 6.2 | 130 | 0.8 | 1.4 | 3.3 | 3.1 |
| 40 | 36 | 2.5 | 6.3 | 110 | 0.9 | 1.4 | 3.4 | 3.2 |
| 50 | 38 | 1.8 | 6.5 | 80 | 1.0 | 1.4 | 3.5 | 3.3 |

TABLE 4

Parameters in the demineralization of an acid whey concentrate (pH 4.1) when using electrolysis

| Time (min) | Temperature (°C.) | Current/cell (A) | Voltage/cell (V) | Current density (A/m$^2$) | Flow whey (l/min) | Flow acid (l/min) | Flow base (l/min) | anolyte |
|---|---|---|---|---|---|---|---|---|
| 0  | 27 | 4.2 | 5.3 | 180 | 1.6 | 2.5 | 5.4 | 5.4 |
| 10 | 32 | 4.0 | 5.5 | 170 | 0.7 | 1.3 | 3.0 | 3.0 |
| 20 | 35 | 3.4 | 5.5 | 150 | 0.8 | 1.4 | 3.0 | 3.0 |
| 30 | 37 | 2.7 | 6.0 | 120 | 0.9 | 1.4 | 3.1 | 3.0 |
| 40 | 39 | 1.8 | 6.3 | 80  | 1.0 | 1.4 | 3.0 | 3.1 |

TABLE 5

Results from the demineralization of acid whey concentrate (pH 4.1) when electrolysis was used

| | Time (min) 0 | 10 | 20 | 30 | 40 |
|---|---|---|---|---|---|
| Whey recirculation | | | | | |
| Dry matter (°Brix) | 15.8 | 14.9 | 14.6 | 14.1 | 13.9 |
| Conductivity (mS/cm) | 12.3 | 6.7 | 3.6 | 1.4 | 0.5 |
| Phosphor, soluble (mg/kg) | 1200 | 1090 | 870 | 550 | 200 |
| Chloride (g/kg) | 9.1 | 4.1 | 1.9 | 0.55 | 0.12 |
| pH | 4.1 | 4.1 | 4.0 | 4.2 | 4.3 |
| Solution volume (l) | 3.2 | | | | 2.8 |
| Acid recirculation | | | | | |
| Titratable acidity (% lactic acid) 2.2 | 3.0 | 3.5 | 3.7 | 3.9 | |
| Conductivity (mS/cm) | 2.2 | 20 | 28 | 34 | 35 |
| pH | 2.3 | 1.4 | 1.2 | 1.1 | 1.1 |
| Phosphor, soluble (mg/kg) | 9 | 43 | 100 | 220 | 390 |
| Chloride (g/kg) | 0.1 | 3.1 | 4.5 | 5.4 | 5.8 |
| Solution volume (l) | 5.5 | | | | 5.6 |
| Base recirculation | | | | | |
| Titratable alkalinity (% sodium hydroxide) | 2.5 | 2.7 | 2.8 | 2.9 | 3.0 |
| Conductivity (mS/cm) | 63 | 66 | 68 | 70 | 71 |
| Solution volume (l) | 4.1 | | | | 4.0 |

EXAMPLE 4

Example 3 was repeated except that the raw material used was concentrated acid whey. The pH of the concentrate, however, was adjusted to 6.1 before electrolysis. This change had no greater effect on the test results.

EXAMPLE 5

Concentrated permeate obtained from the ultrafiltration of whey was used as a raw material. Table 6 shows the parameters and Table 7 the test results. Otherwise the conditions were the same as in Example 1.

TABLE 6

Parameters in the demineralization of permeate concentrate when using electrolysis

| Time (min) | Temperature (°C.) | Current/cell (A) | Voltage/cell (V) | Current density (A/m$^2$) | Flow whey (l/min) | Flow acid (l/min) | Flow base (l/min) | anolyte |
|---|---|---|---|---|---|---|---|---|
| 0  | 27 | 4.2 | 5.5 | 180 | 1.8 | 2.5 | 5.2 | 5.2 |
| 10 | 31 | 3.6 | 5.7 | 160 | 0.9 | 1.3 | 3.1 | 3.0 |
| 20 | 35 | 2.5 | 6.2 | 110 | 0.9 | 1.4 | 3.3 | 3.2 |
| 30 | 36 | 1.5 | 6.5 | 60  | 1.0 | 1.4 | 3.5 | 3.3 |

TABLE 7

Results from the demineralization of a permeate concentrate when using electrolysis

| | Time (min) 0 | 10 | 20 | 30 |
|---|---|---|---|---|
| Whey recirculation | | | | |
| Dry matter (°Brix) | 17.2 | 16.5 | 16.2 | 16.1 |
| Conductivity (mS/cm) | 9.1 | 3.0 | 1.0 | 0.3 |
| Phosphor, soluble (mg/kg) | 750 | 440 | 180 | 60 |
| Chloride (g/kg) | 3.5 | | | 0.1 |
| pH | 5.2 | 5.1 | 4.3 | 3.4 |
| Solution volume (l) | 3.8 | | | 3.6 |
| Acid recirculation | | | | |
| Titratable acidity (% lactic acid) | 2.2 | 2.8 | 3.1 | 3.2 |
| Conductivity (mS/cm) | 3.7 | 21 | 24 | 25 |
| pH | 2.1 | 1.5 | 1.4 | 1.3 |
| Solution volume (l) | 6.0 | | | 6.6 |
| Base recirculation | | | | |
| Titratable alkalinity (% sodium hydroxide) | 2.3 | 2.5 | 2.6 | 2.7 |
| Conductivity (mS/cm) | 75 | 81 | 84 | 87 |
| Solution volume (l) | 4.8 | | | 4.8 |

EXAMPLE 6

The demineralization test was carried out as described in Example 1 but the raw material used was unconcentrated whey (dry matter 6%). Table 8 shows the most important parameters and results.

TABLE 8

The most important parameters and results of the demineralization of unconcentrated cheese whey

| Time (min) | Temperature (°C.) | Current/cell (A) | Voltage/cell (V) | Current density (A/m$^2$) | Whey conduct. (mS/cm) |
|---|---|---|---|---|---|
| 0  | 21 | 4.2 | 6.7 | 180 | 3.1 |
| 5  | 24 | 1.9 | 7.7 | 82  | 1.2 |
| 10 | 26 | 1.2 | 8.0 | 52  | 0.6 |

It appears from the table that unconcentrated whey, too, demineralizes well whereas a rapid decrease occurs in the current and current density due to the low conductivity. Therefore it is preferable to demineralize concentrated whey.

EXAMPLE 7

The demineralization test was carried out as described in Example 1 except that the raw material used was a mother liquor formed in the production of lactose and having a dry matter of about 20%. The following Table 9 shows the most important parameters and results.

TABLE 9

The most important parameters and results in the demineralization of a mother liquor formed in the production of lactose

| Time (min) | Temperature (°C.) | Current-density (A/m$^2$) | Conduct. of mother liquor (mS/cm) | Conduct. of acid solution (mS/cm) | Conduct. of base solution (mS/cm) |
|---|---|---|---|---|---|
| 0 | 24 | 180 | 17 | 2.8 | 79 |
| 10 | 29 | 180 | 9.5 | 25 | 84 |
| 20 | 32 | 170 | 6.7 | 35 | 90 |
| 30 | 35 | 150 | 4.3 | 40 | 95 |
| 40 | 36 | 110 | 2.8 | 42 | 98 |
| 50 | 39 | 86 | 1.8 | 43 | 100 |
| 60 | 41 | 68 | 1.2 | 43 | 102 |

It appears from the table that the process is also well suited for a mother liquor formed in the production of lactose.

EXAMPLE 8

The raw material used was the same cheese whey concentrate as in Example 1 and the run conditions were the same with the exception that the starting solution used in the acid recirculation was not 3% lactic acid but a 1% acid solution having an anion composition corresponding to that of whey. Correspondingly, the startng solution used in the base recirculation was not 3% sodium hydroxide but a 1% base solution having a cation composition corresponding to that of whey. The compositions of these solutions are given in Tables 10 and 11. The acid and base recirculation solution after the first run was used as a starting solution in the next run. The acid and base recirculation solutions after the second run were used as starting solutions in the third run. After the third run the compositions of the solutions were analyzed and they are shown in Tables 10 and 11.

TABLE 10

Composition of the acid solution before the first run and after the third run

| | Hydrochl. acid | Phosphoric acid | Lactic acid | Citric acid |
|---|---|---|---|---|
| Acid before run I | 0.25% | 0.25% | 0.25% | 0.25% |
| Acid after run III | 0.83% | 0.60% | 0.78% | 0.67% |

TABLE 11

Composition of the base solution before the first run and after the third run

| | KOH | NaOH | Ca(OH)$_2$ | Mg(OH)$_2$ |
|---|---|---|---|---|
| Base before run I | 0.65% | 0.22% | 0.11% | 0.02% |
| Base after run III | 2.1% | 0.68% | 0.25% | 0.04% |

EXAMPLE 9

The acid produced in Example 8 was concentrated by evaporating to a concentration of 30%. The solution was completely clear and slightly yellowish in colour. The pH of the whey drink was adjusted from 4.5 to 3.8 with said acid. Normally, the pH adjustment is carried out by means of citric acid. A test panel observed no difference when comparing a drink adjusted with said acid solution with a normal product.

EXAMPLE 10

The base produced in Example 8 was used for adjusting the pH of curd whey from 4.5 to 6.0 before drying. Normally, the pH is adjusted with sodium hydroxide. The drying of a curd whey neutralized with said base solution was as successful as that of a normal product and the powders had an equally good taste.

We claim:

1. A process for removing at least a portion of salts contained in a liquid selected from whey and liquids based on whey by means of electrolysis while producing an acid mixture and a base mixture useful in food industries, the process comprising providing a four-compartment electrolytic cell in the electrolysis of the liquid selected from whey and liquids based on whey, the electrolytic cell including in succession (a) an anolyte compartment defined by an anode plate and a first catio exchange membrane, (b) an acid compartment defined by the first cation exchange membrane and an anion exchange membrane, (c) a whey compartment defined by the anion exchange membrane and a second cation exchange membrane and intended for the liquid to be treated which is selected from whey and liquids based on whey, and (d) a base compartment defined by the second cation exchange membrane and a cathode plate, independent liquid recirculations being connected to each one of the four compartments of the electrolytic cell; using a starting solution in the liquid recirculation connected with the whey compartment, selected from cheese whey, acid whey, permeate and a mother liquor from the production of lactose, and from cheese whey, acid whey, permeate and a mother liquor from the production of lactose, each as concentrated to a dry matter content of no more than 40% by weight; using a starting solution in the acid recirculation connected with the acid compartment, a liquid selected from acid solutions having an anion composition corresponding to that of the liquid to be treated which is selected from whey and liquids based on whey, and lactic acid; using a starting solution in the base recirculation connected with the base compartment selected from base solutions having a cation composition corresponding to that of the liquid to be treated which is selected from whey and liquids based on whey, and sodium hydroxide; and using a starting solution in the anolyte recirculation connected with the anolyte compartment selected from an aqueous solution of an acid.

2. A process according to claim 1, wherein the starting solution used in the anolyte recirculation is an aqueous solution of a 0.5 to 3% by weight acid.

3. A process according to claim 1, wherein the starting solution used in the liquid recirculation connected with the whey compartment is a liquid selected from cheese whey and acid whey, each as such, and from cheese whey and acid whey, each as concentrated to a dry matter content of no more than 40% by weight; the starting solution used in the acid recirculation connected with the acid compartment is a 1% by weight acid solution having an anion composition corresponding to that of the whey to be treated; the starting solution used in the base recirculation connected with the base compartment is a 1% by weight base solution having a cation composition corresponding to that of the whey to be treated; and the starting solution used in the anolyte recirculation connected with the anolyte compartment is an aqueous solution of 1% by weight sulphuric acid; and wherein the process temperature ranged from 0° to 60° C.

4. A process according to claim 3, wherein the process temperature ranges from 20° to 50° C.

5. A process according to claim 1, wherein the acid recirculation is passed into the acid recirculation of at least one other electrolytic cell.

6. A process according to claim 1, wherein the acid recirculation is recovered as such and used in food industries as a food grade acid for pH adjustment and as a washing solution.

7. A process according to claim 6, wherein the recovered acid recirculation is concentrated before its use.

8. A process according to claim 1, wherein the base recirculation is passed into the base recirculation of at least one other electrolytic cell.

9. A process according to claim 1, wherein the base recirculation is recovered as such and used in food industries as a food grade base for pH adjustment and as a washing solution.

10. A process according to claim 9, wherein the recovered base recirculation is concentrated before its use.

11. A process according to the claim 1, wherein the whey recirculation is recovered as such.

12. A process according to claim 11, wherein the recovered whey recirculation is concentrated and dried into a powder.

* * * * *